US012550620B2

(12) United States Patent
Xie et al.

(10) Patent No.: US 12,550,620 B2
(45) Date of Patent: Feb. 10, 2026

(54) TOP ELECTRODE TO METAL LINE CONNECTION FOR MAGNETO-RESISTIVE RANDOM-ACCESS MEMORY STACK HEIGHT REDUCTION

(71) Applicant: INTERNATIONAL BUSINESS MACHINES CORPORATION, Armonk, NY (US)

(72) Inventors: Ruilong Xie, Niskayuna, NY (US); Tao Li, Albany, NY (US); Tsung-Sheng Kang, Ballston Lake, NY (US); Alexander Reznicek, Troy, NY (US); Chih-Chao Yang, Glenmont, NY (US)

(73) Assignee: International Business Machines Corporation, Armonk, NY (US)

( * ) Notice: Subject to any disclaimer, the term of this patent is extended or adjusted under 35 U.S.C. 154(b) by 920 days.

(21) Appl. No.: 17/457,565

(22) Filed: Dec. 3, 2021

(65) Prior Publication Data

US 2023/0180621 A1 Jun. 8, 2023

(51) Int. Cl.
*H10N 50/10* (2023.01)
*G11C 11/16* (2006.01)
*H01L 23/522* (2006.01)
*H10B 61/00* (2023.01)
*H10N 50/01* (2023.01)
*H10N 50/80* (2023.01)
*H10N 50/85* (2023.01)

(52) U.S. Cl.
CPC .......... *H10N 50/10* (2023.02); *G11C 11/161* (2013.01); *H01L 23/5226* (2013.01); *H10B 61/00* (2023.02); *H10N 50/01* (2023.02); *H10N 50/80* (2023.02); *H10N 50/85* (2023.02)

(58) Field of Classification Search
CPC ........ H10N 50/10; H10N 50/01; H10N 50/80; H10N 50/85; G11C 11/161; H01L 23/5226; H10B 61/00
See application file for complete search history.

(56) References Cited

U.S. PATENT DOCUMENTS

| 1,017,069 | A | 2/1912 | Andrews |
| 8,796,795 | B2 | 8/2014 | Satoh |
| 9,343,659 | B1 | 5/2016 | Lu |
| 9,406,875 | B2 | 8/2016 | Li |
| 9,704,919 | B1 | 7/2017 | Lu |
| 9,818,935 | B2 | 11/2017 | Chuang |

(Continued)

FOREIGN PATENT DOCUMENTS

| KR | 20170096690 A | 8/2017 |
| KR | 101849452 B1 | 4/2018 |

OTHER PUBLICATIONS

Dutta, et al., "Modified Top Electrode Contact for MRAM Embedding in Advanced Logic Nodes", U.S. Appl. No. 17/644,349, filed Dec. 15, 2021, 40 pages.

*Primary Examiner* — Herve-Louis Y Assouman
(74) *Attorney, Agent, or Firm* — Kimberly Zillig

(57) ABSTRACT

A magneto-resistive random access memory device includes a top electrode electrically connected to a conductive interconnect through a metal capping layer located above a top surface and opposite sidewalls of the top electrode, the conductive interconnect is located on opposite sidewalls of the metal capping layer with a top surface of the metal capping layer being coplanar with a top surface of the conductive interconnect.

11 Claims, 9 Drawing Sheets

(56) References Cited

U.S. PATENT DOCUMENTS

| | | |
|---|---|---|
| 10,217,670 B2 | 2/2019 | Tapily |
| 10,297,750 B1 | 5/2019 | Ando |
| 10,312,434 B2 | 6/2019 | Briggs |
| 10,636,963 B2 | 4/2020 | Dai |
| 2008/0198647 A1* | 8/2008 | Kanakasabapathy .. H10N 50/01 365/171 |
| 2013/0075840 A1* | 3/2013 | Satoh ..................... H10N 70/20 257/421 |
| 2016/0072047 A1* | 3/2016 | Seto ....................... H10N 50/80 257/421 |
| 2016/0072055 A1* | 3/2016 | Seto ....................... H10N 50/01 438/3 |
| 2017/0054070 A1* | 2/2017 | Bak ........................ H10N 50/80 |
| 2019/0006222 A1 | 1/2019 | Or-Bach |

\* cited by examiner

TOP ELECTRODE TO METAL LINE CONNECTION FOR MAGNETO-RESISTIVE RANDOM-ACCESS MEMORY STACK HEIGHT REDUCTION

BACKGROUND

The present invention generally relates to the field of magnetic storage devices, and more particularly to high performance magneto-resistive random access memory devices.

Semiconductor storage devices are used in integrated circuits (ICs) to provide data storage. An example of a semiconductor storage device is a magnetic random-access memory (MRAM). MRAM is non-volatile memory in which data is stored by programming a magnetic tunnel junction (MTJ) as part of an MRAM bit cell. One advantage of an MRAM is that MTJs can retain stored information even when power is turned off. This is because data is stored in the MTJ as a small magnetic element rather than as an electric charge or current. However, integration of MRAM bit cell in back-end-of-the line (BEOL) processes can increase BEOL interconnect resistance due to the increased height of the MRAM stack. Therefore, improved designs and techniques for MRAM integration in BEOL processes would be desirable.

SUMMARY

According to an embodiment of the present disclosure, a memory device includes a top electrode electrically connected to a conductive interconnect through a metal capping layer located above a top surface and opposite sidewalls of the top electrode, the conductive interconnect is located on opposite sidewalls of the metal capping layer, a top surface of the metal capping layer is coplanar with a top surface of the conductive interconnect.

According to another embodiment of the present disclosure, a memory device includes a first conductive interconnect electrically connected to a bottom electrode, the first conductive interconnect and the bottom electrode are located within a first dielectric layer, a magnetic random-access memory pillar located above, and electrically connected to, the bottom electrode, a top electrode above, and electrically connected to, the magnetic random-access memory pillar, and a metal capping layer above a top surface and opposite sidewalls of the top electrode for electrically connecting the top electrode to a second conductive interconnect located on opposite sidewalls of the metal capping layer, a top surface of the metal capping layer is coplanar with a top surface of the second conductive interconnect.

According to yet another embodiment of the present disclosure, a method of forming a memory device includes forming a top electrode electrically connected to a second conductive interconnect through a metal capping layer located above a top surface and opposite sidewalls of the top electrode, the second conductive interconnect is located on opposite sidewalls of the metal capping layer, a top surface of the metal capping layer is coplanar with a top surface of the second conductive interconnect.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1A:
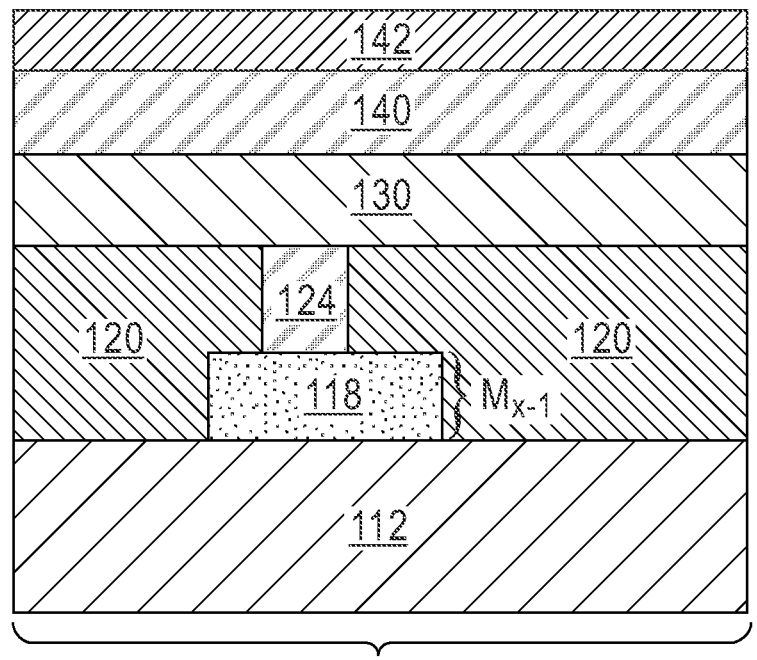
FIG. 1A is a cross-sectional view of a memory device taken along a magneto-resistive random access region during a back-end-of-the-line integration process, according to an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Embodiments of the present disclosure provide a memory device, and a method of making the same, in which a low-resistance capping metal is formed above a top electrode of a magnetic random-access memory (MRAM) cell for electrically connecting the top electrode to a subsequently formed Mx interconnect level. In the proposed embodiments, an Mx conductive interconnect structure is formed on opposite sides of the low-resistance capping metal instead of vertically stacked above the top electrode. This allows a top surface of the Mx conductive interconnect structure being coplanar with a top surface of the top electrode thereby reducing a height of the MRAM memory cell and, in consequence, a height of a Vx-1 via. Reducing the Vx-1 via height decreases interconnect resistance improving the back-end-of-the-line (BEOL) integration process.

An embodiment by which the memory device with coplanar top electrode and Mx conductive interconnect can be formed is described in detailed below by referring to the accompanying drawings in FIGS. 1A-9B.

Figure 1B:
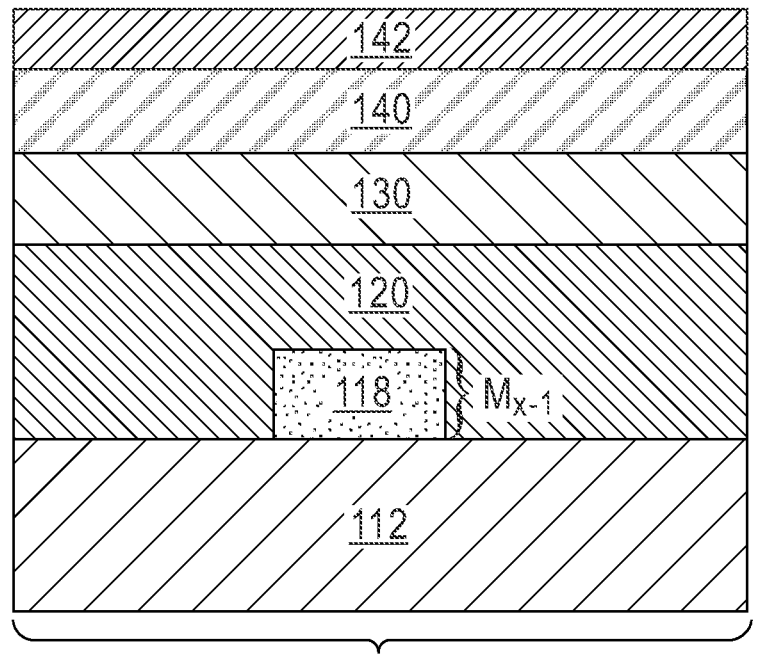
FIG. 1B is a cross-sectional view of the memory device taken along a logic region.

Referring now to FIGS. 1A-1B, cross-sectional views of a memory device 100 are shown during a BEOL integration process, according to an embodiment of the present disclosure. In this embodiment, FIG. 1A is a cross-sectional view of the memory device 100 taken along an MRAM region 100A; and FIG. 1B is a cross-sectional view of the memory device 100 taken along a logic region 100B.

At this step of the manufacturing process, the memory device 100 may include a first conductive interconnect 118 within a first dielectric layer 120. The first conductive interconnect 118 is electrically connected to a device level 112. A bottom electrode 124 provides electrical contact between the first conductive interconnect 118 (Mx-1) and an MRAM stack 130, as depicted in FIG. 1A. A top electrode 140 is located above, and in electrical contact with, the MRAM stack 130. A first hardmask 142 is formed above the top electrode 140.

Although not depicted in the figures, the device level 112 may include a plurality of field effect transistors devices having a variety of different configurations, e.g., planar transistor devices, finFET transistor devices, nanowire transistor devices, and the like. Field effect transistors (FETs) are typically operated on a switched mode, that is, these devices exhibit a highly conductive state (on-state) and a high impedance state (off-state). Typically, the on/off state of field effect transistors is controlled by a gate electrode, which controls, upon application of an appropriate control voltage, the conductivity of a channel region formed between a drain region and a source region. The device level 112 may also include contact structures for establishing an electrical connection to the FET devices. As known by those skilled in the art, according to a circuit design the contact structures may include source/drain (CA) contacts for establishing an electrical connection to the source and drain regions and gate (CB) contacts for establishing an electrical connection to the gate electrode. In addition to active circuit elements or semiconductor devices, the device level 112 may also include passive circuit elements such as resistors, capacitors, etc. The device level 112 may further include BEOL interconnect layers located below the Mx-1 metal level.

The first dielectric layer 120 may include, for example, a low-k dielectric material having a dielectric constant, k, in the range of approximately 2.4 to approximately 2.7. In some embodiments, the first dielectric layer 120 may include silicon oxide, silicon nitride, hydrogenated silicon carbon oxide, silicon based low-k dielectrics, or porous dielectrics. The first dielectric layer 120 may be formed by any suitable deposition process such as, for example, chemical vapor deposition (CVD), physical vapor deposition (PVD), and the like.

As known by those skilled in the art, in order for circuit components to function as part of the overall integrated circuit (IC), an electrical connection or interconnect structure to the circuit components must be formed. In the case of transistors, this may typically involve forming interconnect structures to the gate and source/drain regions. IC devices include a large number of circuit components arranged in a very complex layout. Therefore, an electrical connection or line arrangement cannot be established for each circuit component within the same device level in which the circuit components are formed. Accordingly, interconnect structures, such as the first conductive interconnect 118, are formed in one or more additional stacked metallization layers formed above the device level 112, which constitute the overall line pattern of the IC. These metallization layers typically include conductive metal lines or vias formed within a layer of dielectric material.

In general, the metal lines (also referred to as wiring lines) provide electrical connections within the same metal level, and the conductive vias provide inter-level or vertical connections between different (metal) line levels. The metal lines and conductive vias are typically formed by etching a recess in the layer of dielectric material (e.g., first dielectric layer 120) and filling the recess with a metal such as copper, tungsten, aluminum, etc., and corresponding barrier layers. In this embodiment, the first conductive interconnect 118 is formed on the first metallization level that is often referred to as the Mx-1 layer. Typically, a plurality of conductive vias (i.e., Vx-1 vias) are used to establish an electrical connection between the Mx-1 layer and a second metallization level or Mx layer.

Interconnect structures (i.e., metal lines and vias) are typically formed using single-damascene or dual-damascene fabrication processes. In the single-damascene process, interconnect structures are manufactured independently, while in the dual-damascene process are manufactured at the same time.

In this embodiment, the first conductive interconnect 118 may consist of a line or wire found in a typical semiconductor circuit. The first conductive interconnect 118 may be fabricated using, for example, a typical single damascene technique in which a first conductive interconnect material may be deposited in a first trench (not shown) formed in the first dielectric layer 120. In one embodiment, the first conductive interconnect 118 may include various barrier liners (not shown). One barrier liner may include, for example, TaN, followed by an additional layer including Ta. The conductive interconnect material may include, for example, Cu, Al, or W. The conductive interconnect material may be formed using a filling technique such as electroplating, electroless plating, chemical vapor deposition, physical vapor deposition or a combination of methods. A seed layer (not shown) may optionally be deposited using an electroplating technique prior to filling the first trench.

With continued reference to FIGS. 1A-1B, the bottom electrode 124 may be deposited on the memory device 100 using standard deposition methods. The conductive material forming the bottom electrode 124 is deposited within a second trench or opening (not shown) formed in the first dielectric layer 120. Exemplary deposition processes that can be used to form the bottom electrode 124 may include chemical vapor deposition (CVD), plasma enhanced chemical vapor deposition (PECVD), and the like. As depicted in the figure, the bottom electrode 124 is formed above, and in electrical contact with, the first conductive interconnect 118. In an exemplary embodiment, the bottom electrode 124 may be composed of a conductive material such as, for example, Ta, TaN, Ti, TiN, Ru, RuN, RuTa, RuTaN, Co, CoWP, CoN, W, WN or any combination thereof.

The MRAM stack 130 is disposed above top surfaces of the first dielectric layer 120 and the bottom electrode 124. For illustration purposes only, without intent of limitation, a simplistically depicted MRAM stack including only one layer is shown in the figure. As known by those skilled in the art, forming the MRAM stack 130 typically involves a sequence of processing steps during which numerous layers of metals and dielectrics are deposited and then patterned. The MRAM stack 130 usually includes free and pinned layers sandwiched around one or more dielectric layers functioning as the tunnel junction. The various material layers of the MRAM stack 130 can be formed by utilizing one or more deposition processes such as, for example, plating, sputtering, plasma enhanced atomic layer deposition (PEALD), plasma enhanced chemical vapor deposition (PECVD) or physical vapor deposition (PVD).

It should be noted that some elements and/or features of the memory device 100 are illustrated in the figures but not described in detail in order to avoid unnecessarily obscuring the presented embodiments.

Similar to the bottom electrode 124, the top electrode 140 may be deposited on the memory device 100 using standard deposition methods. For example, a chemical vapor deposition (CVD) process can be used to form the top electrode 140. In an embodiment, the top electrode 140 may be composed of a conductive material such as, for example, Ta, TaN, Ti, TiN, Ru, RuN, RuTa, RuTaN, Co, CoWP, CoN, W, WN or any combination thereof.

The first hardmask 142 may include a dielectric material such as silicon dioxide, silicon nitride, silicon carbide, and the like deposited by any suitable deposition method known in the art. A (vertical) thickness of the first hardmask 142 may vary between approximately 10 nm to approximately 100 nm, although other thicknesses above or below this range may be used as desired for a particular application.

Figure 2A:
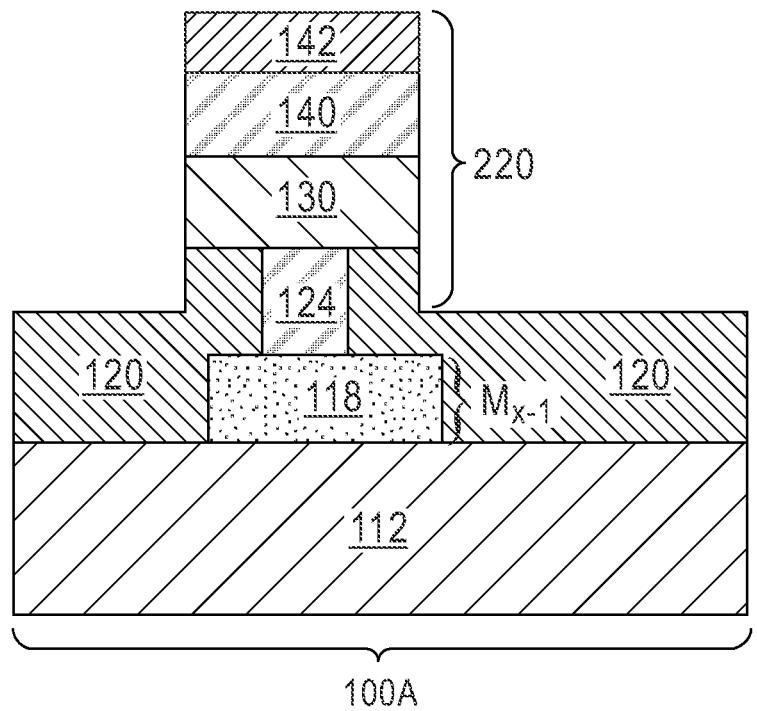
FIG. 2A is a cross-sectional view of a memory device taken along a magneto-resistive random access region after patterning of a top electrode and a magneto-resistive random access stack, according to an embodiment of the present disclosure.
Figure 2B:
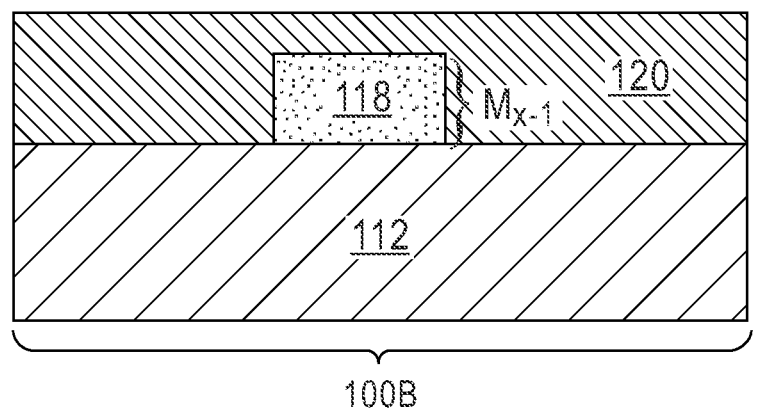
FIG. 2B is a cross-sectional view of the memory device taken along a logic region.

Referring now to FIGS. 2A-2B, cross-sectional views of the memory device 100 are shown after patterning of the top electrode 140 and MRAM stack 130, according to an embodiment of the present disclosure. In this embodiment, FIG. 2A is a cross-sectional view of the memory device 100 taken along an MRAM region 100A; and FIG. 2B is a cross-sectional view of the memory device 100 taken along a logic region 100B.

The process of patterning the top electrode 140 and the MRAM stack 130 consists of steps well-known in the art, which generally include forming a pattern on a photoresist layer (not shown) that is transferred to the first hardmask 142 and used to pattern the underlying layers (i.e., top electrode 140 and MRAM stack 130) via any suitable etching technique. In an exemplary embodiment, an ion beam etch (IBE) technique may be used to pattern the top electrode 140 and the MRAM stack 130 and form a MRAM memory pillar 220.

Figure 3A:
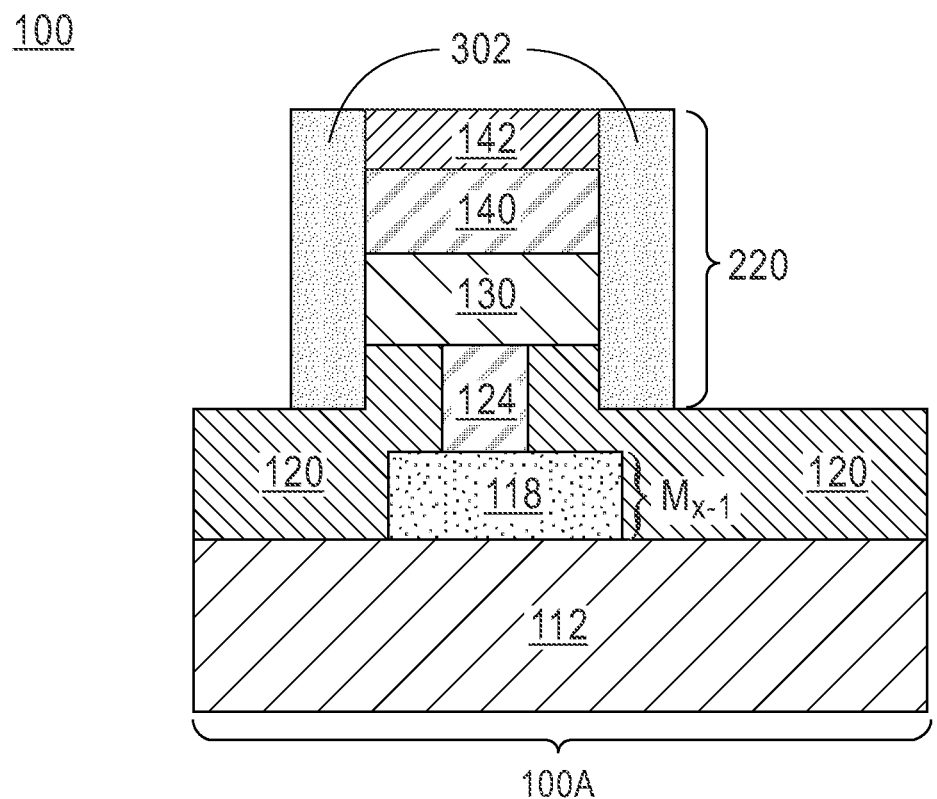
FIG. 3A is a cross-sectional view of a memory device taken along a magneto-resistive random access region after forming protective spacers, according to an embodiment of the present disclosure.
Figure 3B:
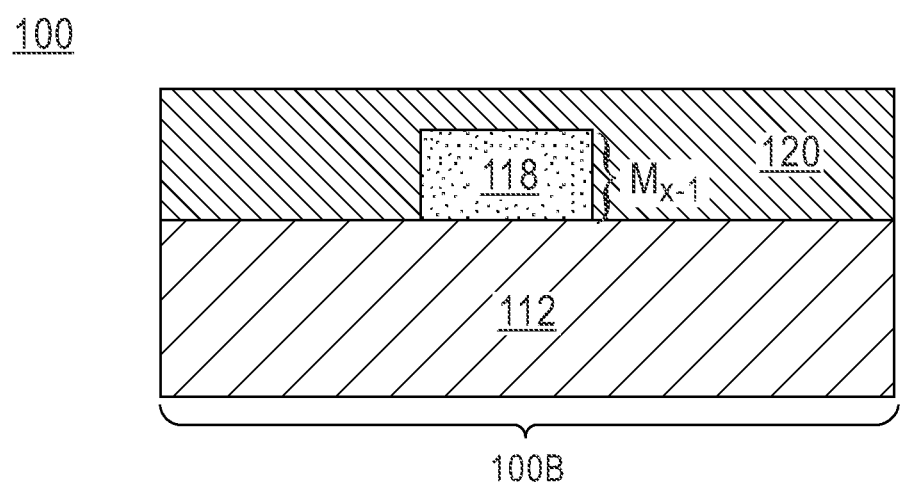
FIG. 3B is a cross-sectional view of the memory device taken along a logic region.

Referring now to FIGS. 3A-3B, cross-sectional views of the memory device 100 are shown after forming protective spacers 302, according to an embodiment of the present disclosure. In this embodiment, FIG. 3A is a cross-sectional view of the memory device 100 taken along an MRAM region 100A; and FIG. 3B is a cross-sectional view of the memory device 100 taken along a logic region 100B.

The protective spacers 302 may protect the MRAM memory pillar 220 during subsequent processing steps. The protective spacers 302 may be formed along opposite sidewalls of the MRAM memory pillar 220 and first hardmask 142, as illustrated in the figure. A bottom surface of the protective spacers 302 contacts a top surface and opposite sidewalls of the first dielectric layer 120.

According to an embodiment, the protective spacers 302 may be made from an insulator material such as an oxide, nitride, oxynitride, silicon carbon oxynitride, silicon boron oxynitride, low-k dielectric, or any combination thereof. Standard deposition and etching techniques may be used to form the protective spacers 302. As known by those skilled in the art, the deposited insulator material is removed from all horizontal surfaces of the memory device 100 using, for example, an anisotropic etch.

According to an embodiment, a (horizontal) thickness of the protective spacers 302 may vary between approximately 6 nm to approximately 40 nm, although other thicknesses above or below this range may be used as desired for a particular application.

Figure 4A:
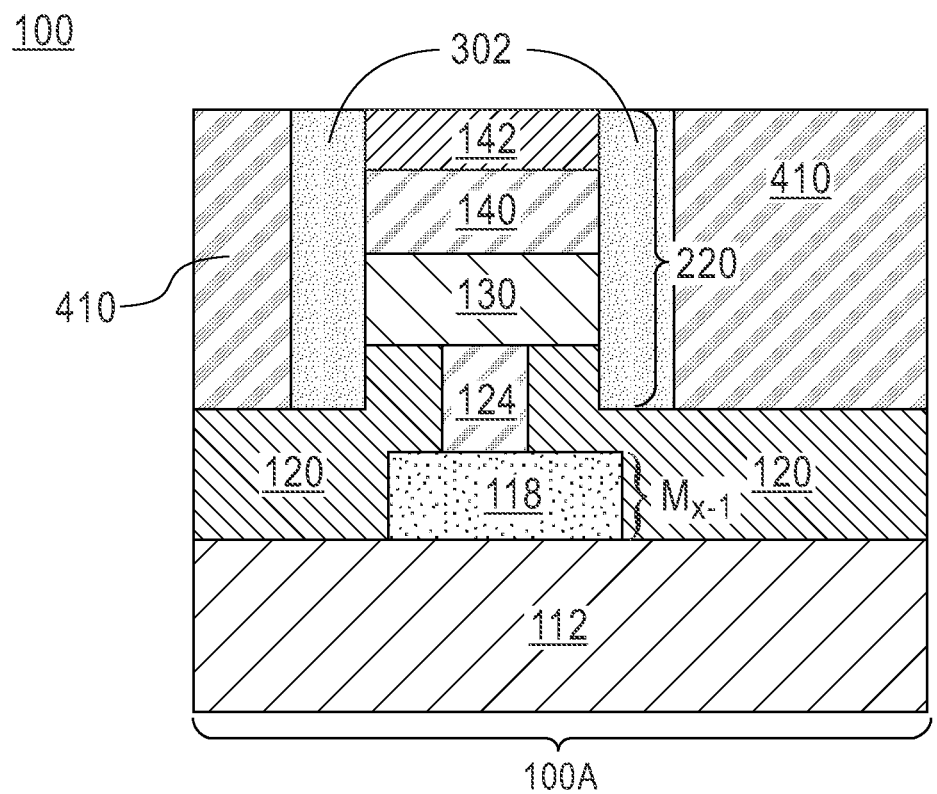
FIG. 4A is a cross-sectional view of a memory device taken along a magneto-resistive random access region after forming a sacrificial layer, according to an embodiment of the present disclosure.
Figure 4B:
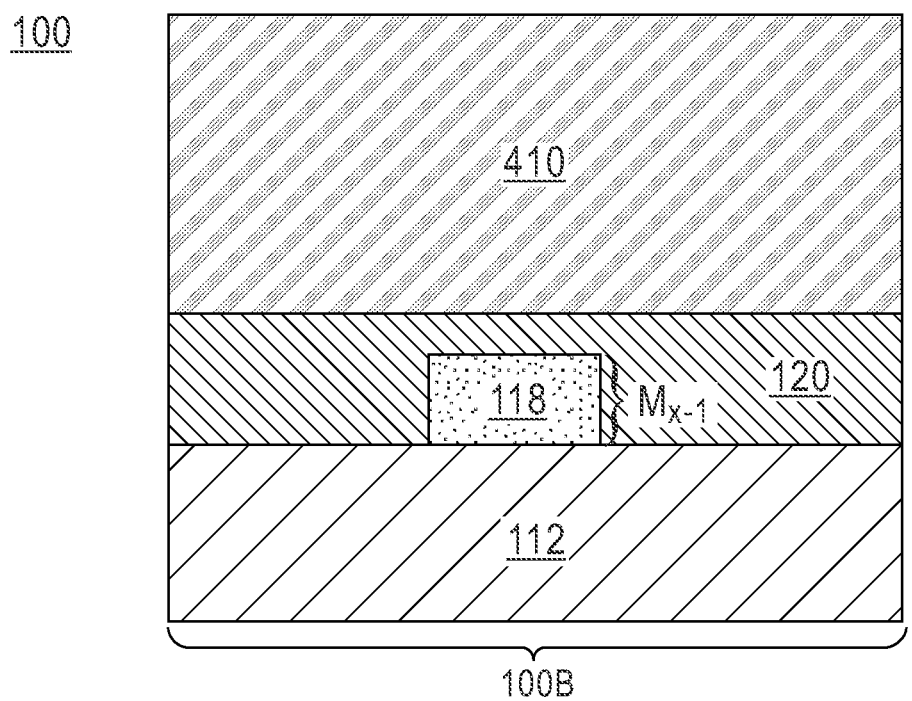
FIG. 4B is a cross-sectional view of the memory device taken along a logic region.

Referring now to FIGS. 4A-4B, cross-sectional views of the memory device 100 are shown after forming a sacrificial layer 410, according to an embodiment of the present disclosure. In this embodiment, FIG. 4A is a cross-sectional view of the memory device 100 taken along an MRAM region 100A; and FIG. 4B is a cross-sectional view of the memory device 100 taken along a logic region 100B.

The sacrificial layer 410 is deposited on the memory device 100 in contact with uppermost surfaces of the first dielectric layer 120 and outer opposite sidewalls of the protective spacers 302. In an embodiment, the sacrificial layer 410 may include, for example, a layer of low-temperature silicon or a layer of titanium oxide (TiOx). In an exemplary embodiment, the sacrificial layer 410 can be formed by an atomic layer deposition (ALD) process or chemical vapor deposition (CVD) process.

In one or more embodiments, after forming the sacrificial layer 410 an etch-back process or chemical mechanical polishing (CMP) can be conducted on the memory device 100 to exposed uppermost surfaces of the protective spacers 302 and first hardmask 142, as depicted in FIG. 4A.

Figure 5A:
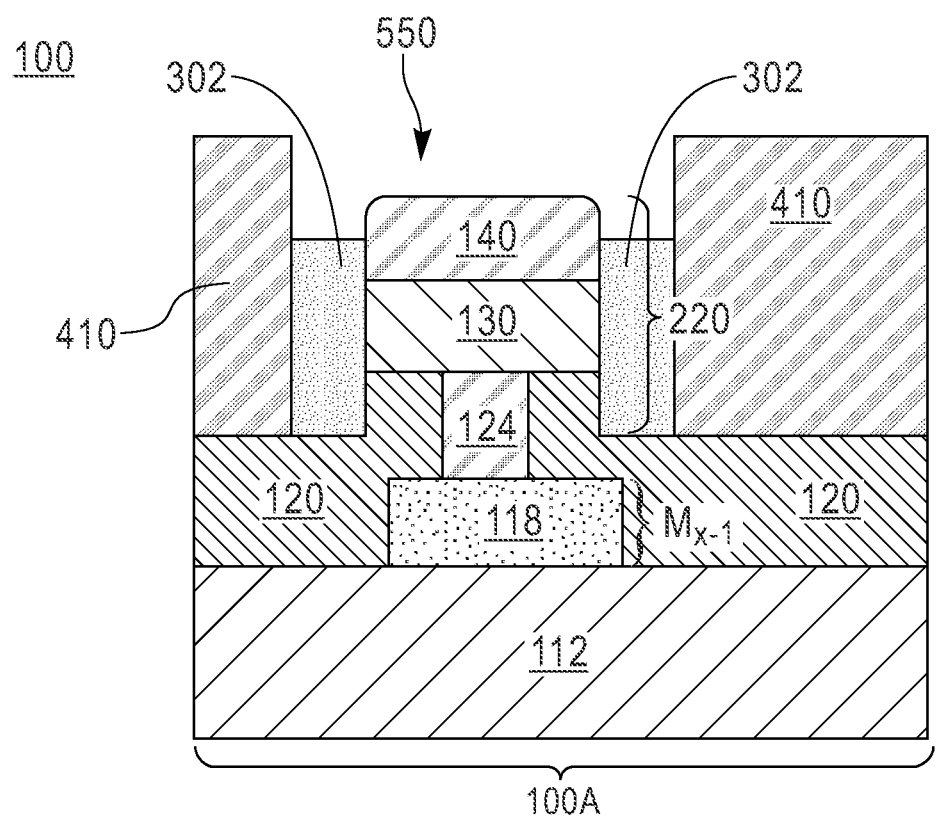
FIG. 5A is a cross-sectional view of a memory device taken along a magneto-resistive random access region after selectively removing a first hardmask and performing spacer pull-down, according to an embodiment of the present disclosure.
Figure 5B:
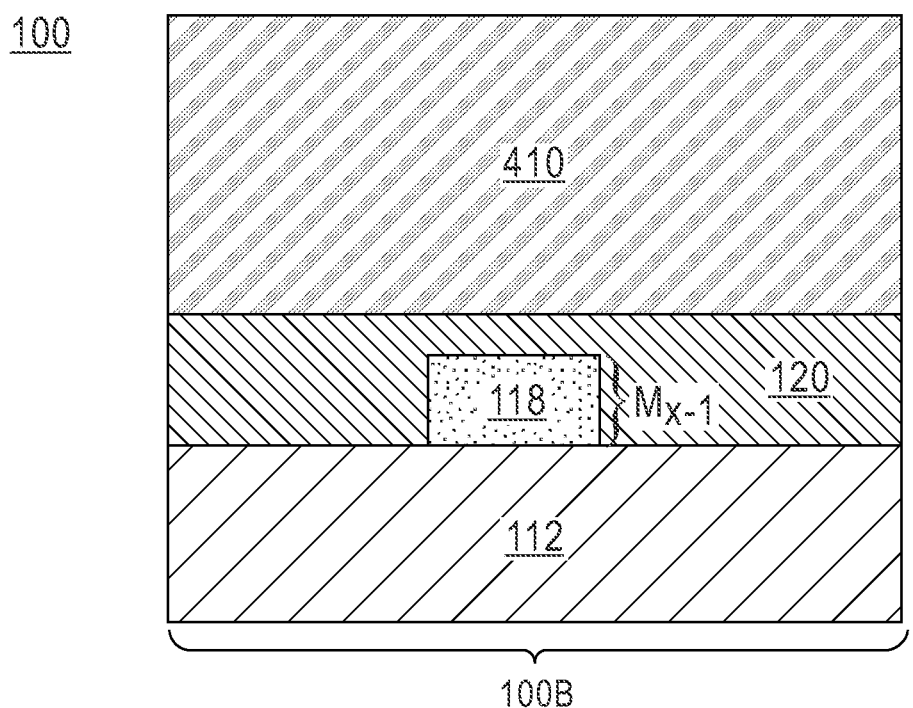
FIG. 5B is a cross-sectional view of the memory device taken along a logic region.

Referring now to FIGS. 5A-5B, cross-sectional views of the memory device 100 are shown after selectively removing the first hardmask 142 and performing spacer pull-down, according to an embodiment of the present disclosure. In this embodiment, FIG. 5A is a cross-sectional view of the memory device 100 taken along an MRAM region 100A; and FIG. 5B is a cross-sectional view of the memory device 100 taken along a logic region 100B.

The first hardmask 142 can be removed using a first etching technique including, for example, reactive ion etching (RIE). After removing the first hardmask 142, a second etching technique can be conducted to selectively remove top portions of the protective spacers 302 and expose an uppermost portion of the top electrode 140, as depicted in the figure. According to an embodiment, the second etching technique may include a highly selective dry etch process.

Removing the first hardmask 142 and recessing the protective spacers 302 creates an opening 550 within the sacrificial layer 410 that exposes the top electrode 140, as depicted in the figure. It should be noted that the uniform size and density of the memory device 100 (i.e., MRAM device) allows the etching process to be controlled very well.

Figure 6A:
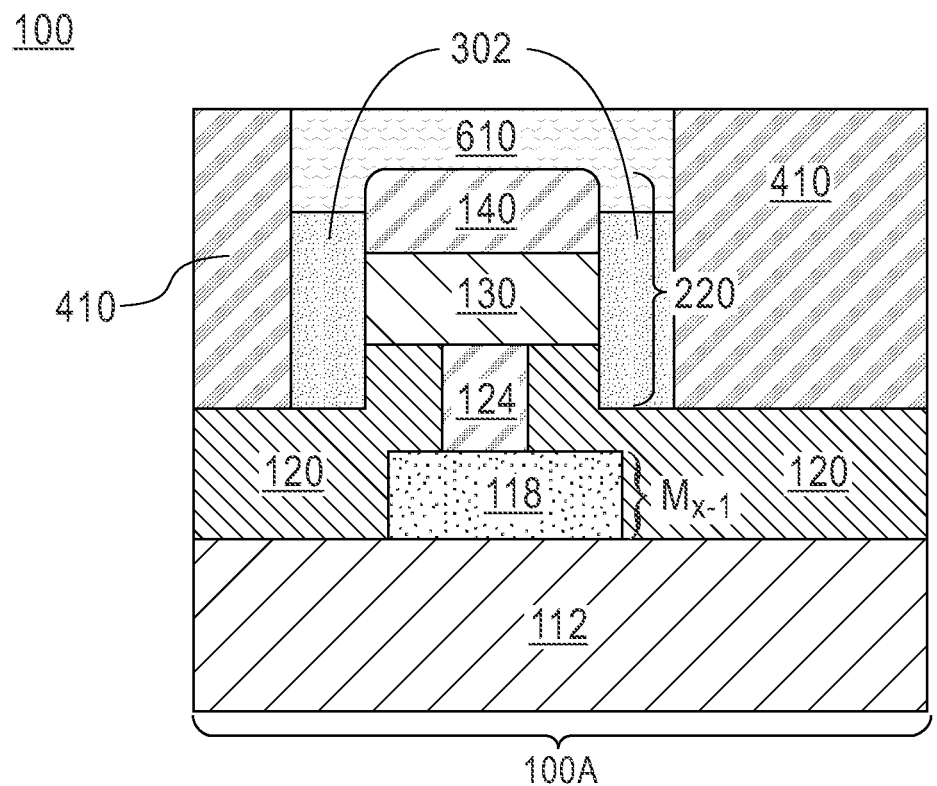
FIG. 6A is a cross-sectional view of a memory device taken along a magneto-resistive random access region after depositing a metal capping layer, according to an embodiment of the present disclosure.
Figure 6B:
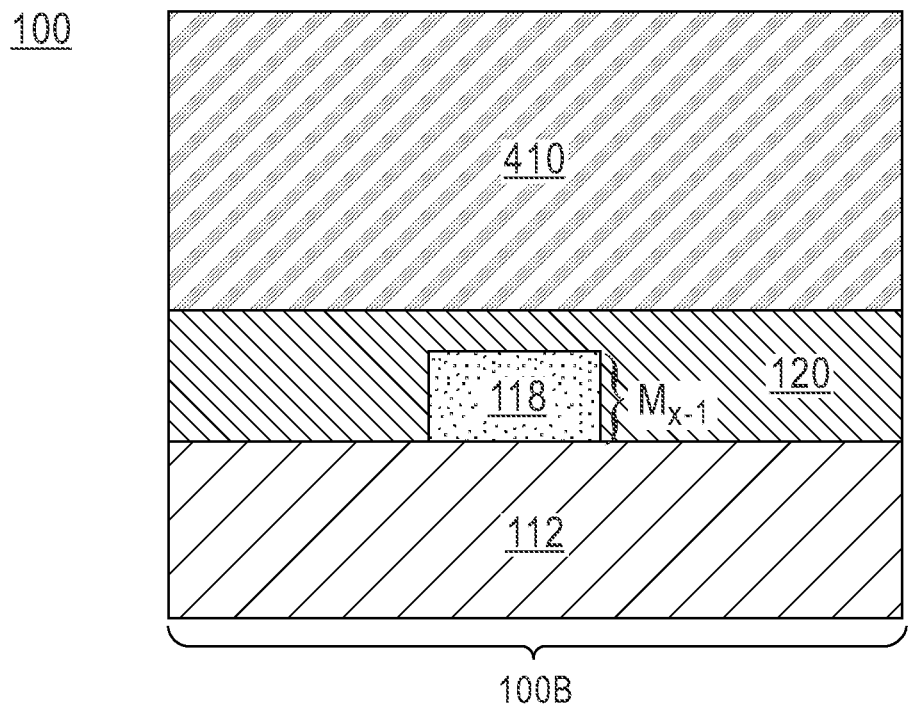
FIG. 6B is a cross-sectional view of the memory device taken along a logic region.

Referring now to FIGS. 6A-6B, cross-sectional views of the memory device 100 are shown after depositing a metal capping layer 610, according to an embodiment of the present disclosure. In this embodiment, FIG. 6A is a cross-sectional view of the memory device 100 taken along an MRAM region 100A; and FIG. 6B is a cross-sectional view of the memory device 100 taken along a logic region 100B.

As illustrated in FIG. 6A, the metal capping layer 610 is deposited within the opening 550 (FIG. 5A) substantially filling the space between inner sidewalls of the sacrificial layer 410 and covering the (exposed) uppermost portion of the top electrode 140. According to an embodiment, the metal capping layer 610 is made of a low-resistance metal in which electrons are capable of flowing smoothly through the material. Non-limiting examples of low-resistance metals to form the metal layer 610 may include ruthenium (Ru), copper (Cu), cobalt (Co), molybdenum (Mo), and the like.

The metal capping layer 610 can be selectively deposited within the opening 550 (FIG. 5A) using any suitable deposition process including, for example, chemical vapor deposition (CVD), physical vapor deposition (PVD), atomic layer deposition (ALD), and the like. According to an embodiment, a (vertical) thickness of the metal capping layer 610 may vary between approximately 10 nm to approximately 50 nm, although other thicknesses above or below this range may be used as desired for a particular application.

It should be noted that by forming the low-resistance metal capping layer 610 over the MRAM top electrode 140, embodiments of the present disclosure may eliminate the need of forming metal lines above the MRAM memory pillar 220, as will be described in detail below.

Figure 7A:
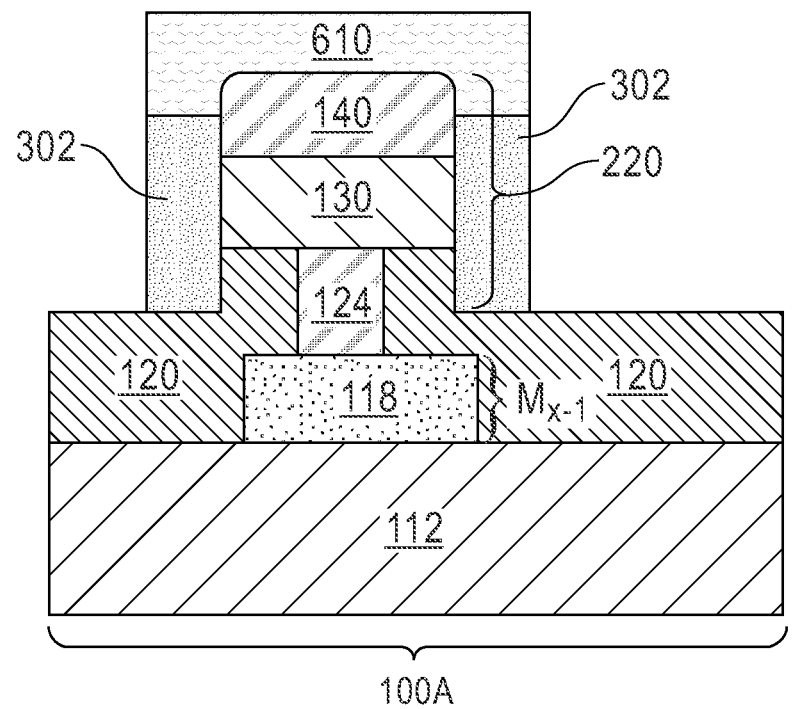
FIG. 7A is a cross-sectional view of a memory device taken along a magneto-resistive random access region after removing a sacrificial layer, according to an embodiment of the present disclosure.
Figure 7B:
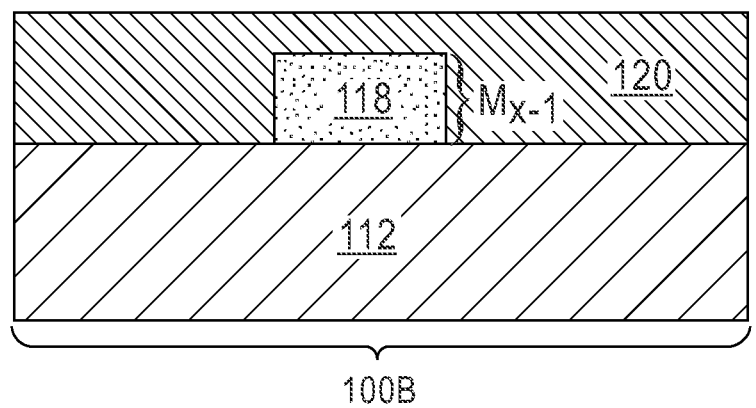
FIG. 7B is a cross-sectional view of the memory device taken along a logic region.

Referring now to FIGS. 7A-7B, cross-sectional views of the memory device 100 are shown after removing the sacrificial layer 410 (FIGS. 6A-6B), according to an embodiment of the present disclosure. In this embodiment, FIG. 7A is a cross-sectional view of the memory device 100 taken along an MRAM region 100A; and FIG. 7B is a cross-sectional view of the memory device 100 taken along a logic region 100B.

Exemplary techniques suitable for removing the sacrificial layer 410 (FIGS. 6A-6B) from the memory device 100 may include, but are not limited to, selective dry or wet etch process, which causes minimal or no damage to the surrounding layers.

Figure 8A:
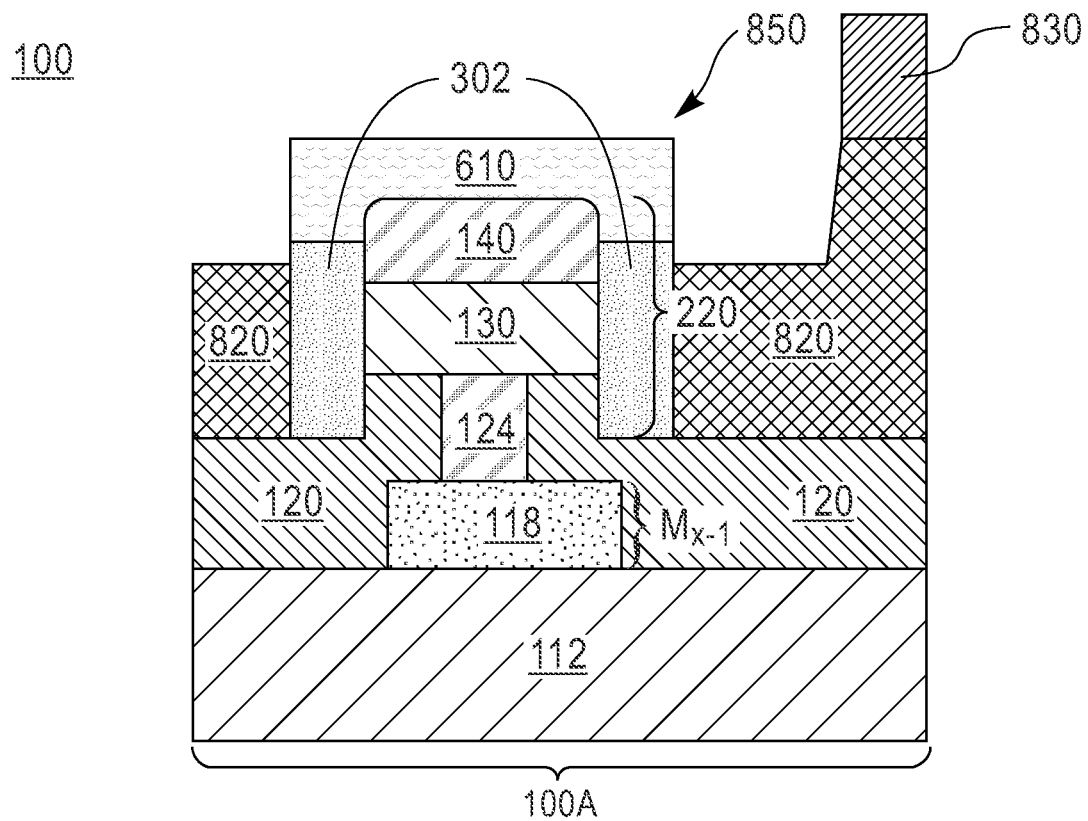
FIG. 8A is a cross-sectional view of a memory device taken along a magneto-resistive random access region after depositing a second dielectric layer and Mx line trench patterning, according to an embodiment of the present disclosure.
Figure 8B:
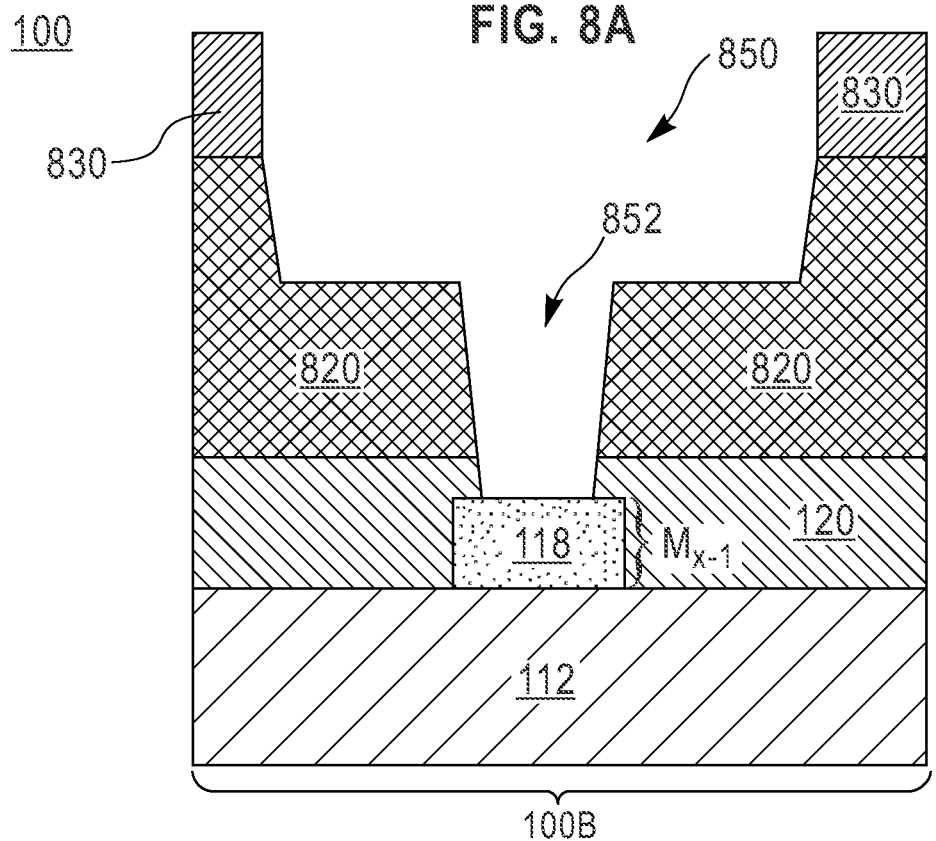
FIG. 8B is a cross-sectional view of the memory device taken along a logic region.

Referring now to FIGS. 8A-8B, cross-sectional views of the memory device 100 are shown after depositing a second dielectric layer 820 and Mx line trench patterning, according to an embodiment of the present disclosure. In this embodiment, FIG. 8A is a cross-sectional view of the memory device 100 taken along an MRAM region 100A; and FIG. 8B is a cross-sectional view of the memory device 100 taken along a logic region 100B.

Similar to the first dielectric layer 120, the second dielectric layer 820 may include, for example, a low-k dielectric material having a dielectric constant, k, in the range of approximately 2.4 to approximately 2.7. In some embodiments, the second dielectric layer 820 may include silicon oxide, silicon nitride, hydrogenated silicon carbon oxide, silicon based low-k dielectrics, or porous dielectrics. The second dielectric layer 820 may be formed by any suitable deposition process such as, for example, chemical vapor deposition (CVD), physical vapor deposition (PVD), and the like.

Also depicted in FIGS. 8A-8B are third trenches or metal patterns 850 formed in the second dielectric layer 820 in preparation for forming the second metallization level or Mx metal layer of the memory device 100. The third trenches 850 may be shaped to accommodate a variety of interconnect structures (e.g., lines or vias) selected based on the circuit design. The third trenches 850 expose a top portion of the metal capping layer 610, as shown in FIG. 8A. The third trenches 850 are generally formed using lithography and etch processing techniques typically used in single-damascene and dual-damascene processes. As known by those skilled in the art, patterning of the second dielectric layer 820 to form the third trenches 850 involves exposing a pattern on a photoresist layer (not shown) and transferring the exposed pattern to a second hardmask 830 formed above the second dielectric layer 820, as depicted in the figures. After transferring the pattern and forming the third trenches 850, the photoresist layer (not shown) and second hardmask 830 can be removed using any photoresist striping method known in the art including, for example, plasma ashing. The second hardmask 830 may be made of similar materials and formed in analogous ways as the first hardmask 142 (FIGS. 1A-1B).

In one or more embodiments, a via trench 852 is typically formed concurrent with the formation of the third trenches 850. The third trenches 850 and the via trench 852 may be fabricated using, for example, a double damascene technique, as will be described in detail below.

Figure 9A:
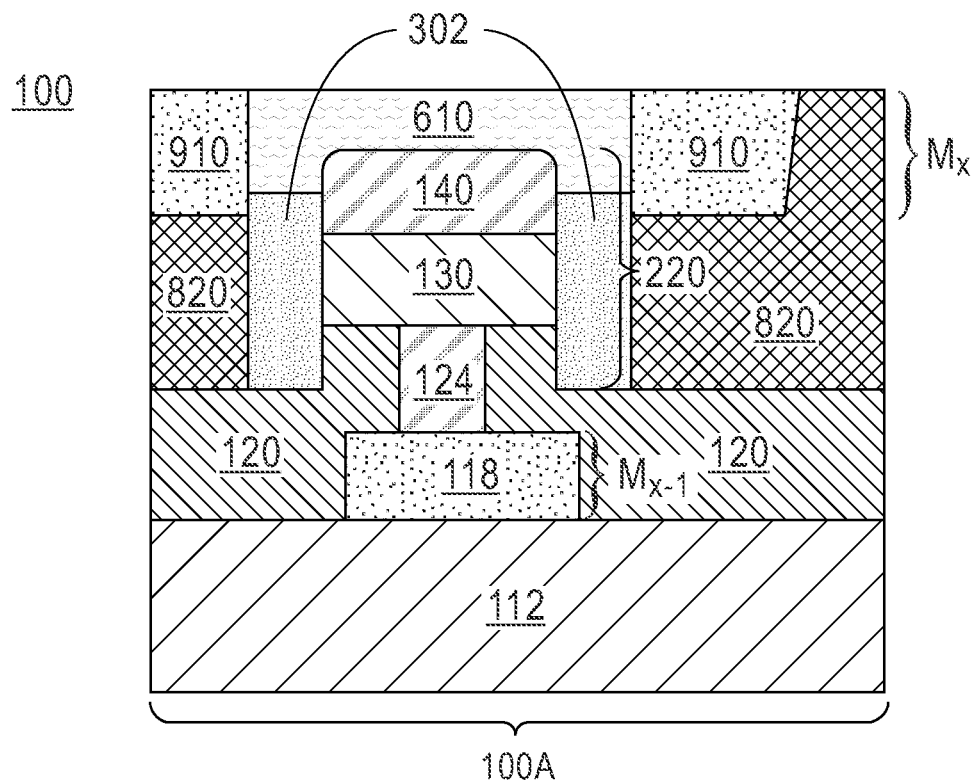
FIG. 9A is a cross-sectional view of a memory device taken along a magneto-resistive random access region after via patterning and copper metallization, according to an embodiment of the present disclosure.
Figure 9B:
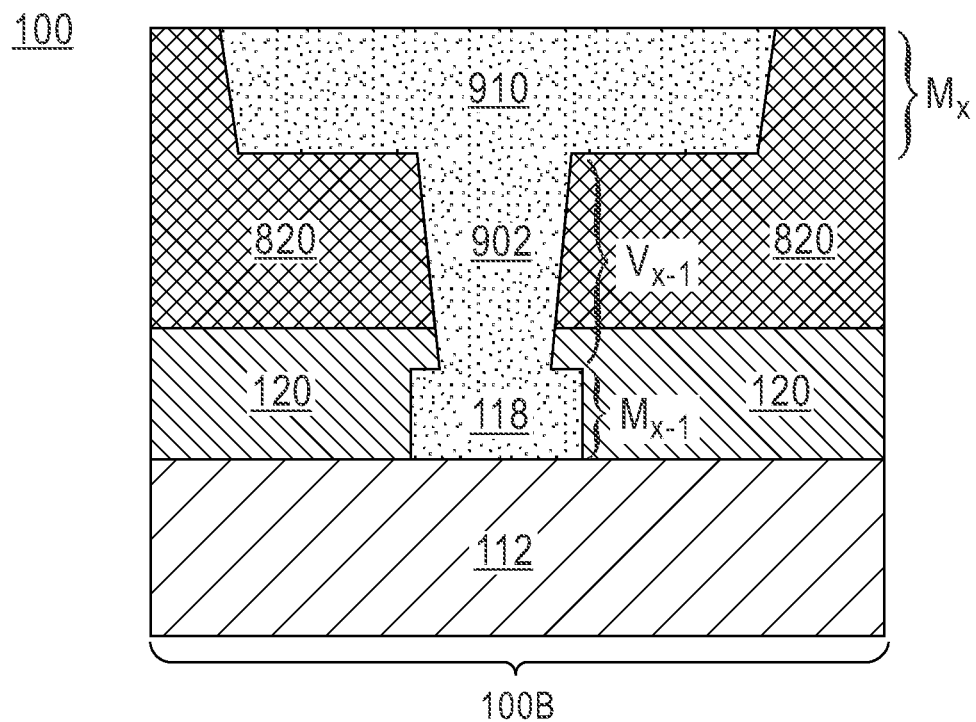
FIG. 9B is a cross-sectional view of the memory device taken along a logic region.

Referring now to FIGS. 9A-9B, cross-sectional views of the memory device 100 are shown after via patterning and copper (Cu) metallization, according to an embodiment of the present disclosure. In this embodiment, FIG. 9A is a cross-sectional view of the memory device 100 taken along an MRAM region 100A; and FIG. 9B is a cross-sectional view of the memory device 100 taken along a logic region 100B.

In this embodiment, a second metallization level or Mx level located above the Mx-1 level is formed. The Mx level may include the second dielectric layer 820 and a second conductive interconnect 910. It should be noted that while only two interconnect levels are shown, the memory device 100 may have multiple interconnect levels above the Mx level and below the Mx-1 level. In some embodiments, a cap dielectric (not shown) may be deposited over the memory device 100 and above the Mx level for electrically insulating the Mx level from additional interconnect levels (not shown) that may be subsequently formed above the Mx level. In embodiments in which a cap dielectric is formed, it may include, for example, $Si_3N_4$, SiC, SiCN, SiCH, or other known capping materials deposited using typical deposition techniques (e.g., CVD) with a thickness varying from approximately 20 nm to approximately 30 nm, and ranges therebetween.

The second conductive interconnect 910 and a via 902 (Vx-1) may be formed in the second dielectric layer 820 in accordance with typical techniques. The second conductive interconnect 910 may consist of a line or wire found in a typical semiconductor circuit. The via 902 may typically be formed concurrent with the formation of the second conductive interconnect 910. As mentioned above, the second conductive interconnect 910 and the via 902 may be fabricated using, for example, a double damascene technique in which the conductive interconnect material may be deposited in the via trench 852 and the third trenches 850 (FIGS. 8A-8B) formed in the second dielectric layer 820. In one embodiment, the second conductive interconnect 910 and the via 902 may include various barrier liners (not shown). One barrier liner may include, for example, TaN, followed by an additional layer including Ta. The conductive interconnect material may include, for example, Cu, Al, or W. The conductive interconnect material may be formed using a filling technique such as electroplating, electroless plating, chemical vapor deposition, physical vapor deposition or a combination of methods. A seed layer (not shown) may optionally be deposited prior to filling the trench using an electroplating technique.

Vias, such as the via 902, are generally used to form electrical connections between the metallization of two interconnect levels. Thus, the via 902 may provide an electrical connection between the first conductive interconnect 118 (Mx-1) and the second conductive interconnect 910 (Mx). In an exemplary embodiment, the via 902 may have an aspect ratio of about 4:1 or more, and a diameter or width ranging from about 10 nm to about 50 nm and ranges therebetween, although a via diameter less than 10 nm and greater than 50 nm may be acceptable.

Accordingly, as depicted in FIG. 2B, the logic region 100B includes the second conductive interconnect 910 (Mx) on the via 902 (Vx-1) within the second dielectric layer 820. The via 902 (Vx-1) provides electrical contact between the first conductive interconnect 118 (Mx-1) and the second conductive interconnect 910 (Mx). Also, as can be observed in FIG. 9A, the MRAM region 100A includes a first portion of the second conductive interconnect 910 on a first side of the metal capping layer 610 and a second portion of the second conductive interconnect 910 on a second (opposite) side of the metal capping layer 610. Stated differently, the second conductive interconnect 910 is substantially coplanar with the top electrode 140 of the MRAM memory pillar 220. Thus, the first portion of the second conductive interconnect 910 is electrically connected to the second portion of the second conductive interconnect 910 via the (low-resistance) metal capping layer 610. The first and second portions of the second conductive interconnect 910 are also electrically connected to the top electrode 140 of the MRAM memory pillar 220 via the metal capping layer 610.

Therefore, by forming the (low-resistance) metal capping layer 610 above the top electrode 140 and forming the second conductive interconnect 910 (Mx) on opposite sides or lateral portions of the metal capping layer 610, an electrical connection can be established between the MRAM memory pillar 220 and the second conductive interconnect 910 via the metal capping layer 610 without increasing a height of the via 902 (Vx-1). This may reduce the BEOL interconnect resistance thereby improving device performance and reliability.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Spatially relative terms, such as "inner," "outer," "beneath," "below," "lower," "above," "upper," "top," "bottom," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" may encompass both an orientation of above and below. The device may be otherwise oriented (rotated 90 degrees or at other orientations) and the spatially relative descriptors used herein interpreted accordingly.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A memory device, comprising:
    a top electrode electrically connected to a first conductive interconnect through a metal capping layer, the metal capping layer being located above a top surface and opposite sidewalls of the top electrode, the first conductive interconnect being located on opposite sidewalls of the metal capping layer, a top surface of the metal capping layer being coplanar with a top surface of the first conductive interconnect;
    a second conductive interconnect electrically connected to a bottom electrode, the second conductive interconnect and the bottom electrode being located within a first dielectric layer; and
    a via for electrically connecting the first conductive interconnect and the second conductive interconnect.

2. The memory device of claim 1, wherein the metal capping layer comprises a low-resistance material.

3. The memory device of claim 2, wherein the low-resistance material comprises at least one of ruthenium, copper, cobalt, and molybdenum.

4. The memory device of claim 1, wherein the top surface of the metal capping layer being coplanar with the top surface of the first conductive interconnect reduces a height of a memory pillar comprising the top electrode.

5. A memory device, comprising:
    a first conductive interconnect electrically connected to a bottom electrode, the first conductive interconnect and the bottom electrode being located within a first dielectric layer;
    a magnetic random-access memory pillar located above, and electrically connected to, the bottom electrode;
    a top electrode above, and electrically connected to, the magnetic random-access memory pillar;
    a metal capping layer above a top surface and opposite sidewalls of the top electrode for electrically connecting the top electrode to a second conductive interconnect located on opposite sidewalls of the metal capping layer, wherein a top surface of the metal capping layer is coplanar with a top surface of the second conductive interconnect; and
    a via for electrically connecting the first conductive interconnect and the second conductive interconnect.

6. The memory device of claim 5, wherein the metal capping layer comprises a low-resistance material.

7. The memory device of claim 6, wherein the low-resistance material comprises at least one of ruthenium, copper, cobalt, and molybdenum.

8. The memory device of claim 5, wherein the top surface of the metal capping layer being coplanar with the top surface of the second conductive interconnect reduces a height of the magnetic random-access memory pillar comprising the top electrode.

9. The memory device of claim 5, further comprising:
    a protective spacer disposed on sidewalls of the magnetic random-access memory pillar and sidewalls of a bottom portion of the top electrode.

10. The memory device of claim 5, wherein the first conductive interconnect and the second conductive interconnect are formed within a second dielectric layer disposed above the first dielectric layer.

11. The memory device of claim 5, further comprising:
    a device level below, and electrically connected to, the first conductive interconnect.

* * * * *